US009466141B2

(12) United States Patent
Lee (10) Patent No.: US 9,466,141 B2
(45) Date of Patent: Oct. 11, 2016

(54) SYSTEM FOR PROVIDING THREE-DIMENSIONAL DIGITAL ANIMATION VIEWER AND METHOD THEREOF (71) Applicant: Choong-young Lee, Gyeonggi-do (KR)

(72) Inventor: Choong-young Lee, Gyeonggi-do (KR)

( * ) Notice: Subject to any disclaimer, the term of this patent is extended or adjusted under 35 U.S.C. 154(b) by 0 days.

(21) Appl. No.: 14/405,621

(22) PCT Filed: May 24, 2013

(86) PCT No.: PCT/KR2013/004560
§ 371 (c)(1),
(2) Date: Dec. 4, 2014

(87) PCT Pub. No.: WO2013/183877
PCT Pub. Date: Dec. 12, 2013

(65) Prior Publication Data
US 2015/0170394 A1 Jun. 18, 2015

(30) Foreign Application Priority Data
Jun. 5, 2012 (KR) ........................ 10-2012-0060424

(51) Int. Cl.
*G06T 13/20* (2011.01)
*G06T 19/00* (2011.01)
*H04N 13/02* (2006.01)
(52) U.S. Cl.
CPC ............. *G06T 13/20* (2013.01); *G06T 19/003* (2013.01); *H04N 13/026* (2013.01)
(58) Field of Classification Search
None
See application file for complete search history.

(56) References Cited

U.S. PATENT DOCUMENTS

2006/0092154 A1 5/2006 Lee

FOREIGN PATENT DOCUMENTS

| JP | 2003099797 A | 4/2003 |
| KR | 10-0370869 B1 | 2/2003 |
| KR | 10-0477324 B1 | 3/2005 |
| KR | 20070095031 A | 9/2007 |
| KR | 20110116275 A | 10/2011 |

OTHER PUBLICATIONS

Liang, D., Huang, Q., Video2Cartoon: A System for Converting Broadcast Soccer Video into 3D Cartoon Animation, IEEE Transactions on consumer Electronics, vol. 53, No. 3, Aug. 2007, pp. 1138-1146.*

* cited by examiner

*Primary Examiner* — Said Broome
(74) *Attorney, Agent, or Firm* — Howson & Howson LLP (57) ABSTRACT A method for providing a three-dimensional (3D) digital cartoon viewer comprises the steps of: converting a specific, user-selected 2D digital cartoon into a 3D digital cartoon and storing the 3D digital cartoon; producing a camera-directed 3D digital cartoon by storing user-generated camera walking data in corresponding frames of the 3D digital cartoon; and displaying the camera-directed 3D digital cartoon on the user terminal. The user can freely adjust a rotation angle and store live camera walking data in respective frames. Camera walking data directed by the user's experiences can be stored and shared with, or recommended to, a third party, and the degree of immersion and the degree of realism in the 3D digital cartoon can be improved using visual effects.

9 Claims, 5 Drawing Sheets

SYSTEM FOR PROVIDING THREE-DIMENSIONAL DIGITAL ANIMATION VIEWER AND METHOD THEREOF

TECHNICAL FIELD

The present invention relates to a system for providing a 3D-dimensional digital cartoon viewer and a method thereof, and in particular to a system for providing a 3D digital cartoon viewer and a method thereof which may automatically convert, based on a 3D game engine, a 2D digital cartoon into a 3D digital cartoon and may enable a user to direct by storing camera walking data in each of frames.

BACKGROUND ART

In recent years, various types of cultural formats are provided thanks to the development of the internet technology. As one of such various types, a webtoon is being provided on the internet, wherein the webtoon is a new format combined with the internet and the cartoon. The term "webtoon" is a compound combined with the term "web" representing the internet and the term "cartoon" representing the cartoon itself and simply represents an internet cartoon produced using a variety of multimedia effects. In connection with such a webtoon, the uses of smart devices increase thanks to the fast development of a mobile communication technology. To keep pace with such increasing uses, a digital cartoon content providing server provides a 2D digital cartoon viewer function with which it is possible to read a digital cartoon script, which is converted into a digital file in a smart device, in a form of a 2D digital cartoon by pages or cuts.

The above-mentioned 2D digital cartoon viewer function is characterized in that, when a user touches a cartoon which is displayed in a form of pages, one cut of the cartoon is shown and displayed in a form of cuts, and the user may watch the cartoon while enlarging or contracting the sizes of the pages or screens using a pinch, etc.

However, since the conventional 2D digital cartoon viewer simply allows a user to recognize and see the screens provided by a digital cartoon manufacturer manually, without providing a 3D effect or a sense of reality on the screen, there is still a strong need for a new type of a system and method for providing a 3D digital cartoon viewer wherein a user can more actively recognize and see more augmented reality or images.

SUMMARY OF THE INVENTION

Accordingly, it is an object of the present invention to provide a system for providing a 3D digital cartoon viewer and a method thereof which are characterized in that a 2D digital cartoon viewer program or a 3D digital cartoon viewer program is provided to a user terminal, and a digital cartoon viewer function is performed by automatically converting, based on a 3D game engine, a 2D digital cartoon into a 3D digital cartoon, and camera walking data that a user creates by freely adjusting a rotation angle using a control key is stored in each of frames for thereby providing a 3D digital cartoon content that a user may direct.

It is another object of the present invention to provide a system for providing a 3D digital cartoon viewer and a method thereof which are characterized in that a user may more conveniently see a cartoon with the aid of the provided additional functions such as the functions for enlarging, contracting, rotating 360°, or replaying the screens of the 3D digital cartoon, and a camera walking function that a user has directed based on a user's experience may be stored and shared with or recommended to other users, and an absorption degree and a realization degree of a 3D digital cartoon may be improved by using a visual effect.

It is still another object of the present invention to provide a system for providing a 3D digital cartoon viewer and a method thereof which are characterized in that a user can conveniently see a digital cartoon along with a high resolution and high speed graphic output based on the use of a 3D acceleration engine, and digital cartoon production time may be saved by automatically converting a 2D digital cartoon into a 3D digital cartoon using a 3D game engine.

To achieve the above objects, among the above exemplary embodiments, there is provided a method for providing a 3-Dimensional (3D) digital cartoon viewer which is executed by a digital cartoon content providing server which provides a 2D digital cartoon or a 3D digital cartoon, which includes a step (a) wherein when a 3D digital cartoon viewer function is selected by a user terminal, a predetermined 2D digital cartoon is converted into a 3D digital cartoon based on a 3D game engine forming a 3D image and is stored; a step (b) wherein a camera-directed 3D digital cartoon is produced by storing camera walking data created under a user's direction in a corresponding frame of the 3D digital cartoon; and a step (c) wherein the camera-directed 3D digital cartoon is displayed on the user terminal.

According to another exemplary embodiment of the present invention, the method for providing a 3D digital cartoon viewer includes a step (d) wherein when a function for sharing with other users or a recommendation function is selected by the user terminal, the user-based camera direction list is output, and the camera-directed 3D digital cartoon selected from the camera direction list is output.

According to an exemplary embodiment of the present invention, the step (a) includes a step wherein when a 3D digital cartoon viewer unction is selected by the user terminal, the 2D digital cartoon is output.

According to an exemplary embodiment of the present invention, the step (c) is characterized in that, when the 3D digital cartoon is displayed, the additional functions such as the functions for enlarging, contracting, rotating 360°, or replaying the pages and screens of the 3D digital cartoon, are performed.

According to an exemplary embodiment of the present invention, the step (b) is characterized in that, when camera walking data are created under a user's direction, a special effect may be added by using a VFX (Visual Effect).

According to another exemplary embodiment of the present invention, the step (c) is characterized in that, when the 3D digital cartoon is displayed, a high resolution and high speed graphic output is possible by building a 3D acceleration environment on the web by adopting a 3D acceleration engine.

Among the above exemplary embodiments, the system for providing a 3D digital cartoon viewer which is executed by a digital cartoon content providing server which provides a 2D digital cartoon or a 3D digital cartoon comprises the digital cartoon content providing server which includes a digital cartoon storing module configured to store the script file of the 2D digital cartoon or the 3D digital cartoon; a 3D digital cartoon conversion module configured to convert a predetermined 2D digital cartoon into a 3D digital cartoon based on a 3D game engine which forms a 3D image; a frame storing module configured to stores by frames the 3D digital cartoon converted by the 3D digital cartoon conversion module; a camera walking module configured to product a camera-directed 3D digital cartoon by storing the camera walking data created under a user's direction in the frames of a corresponding 3D digital cartoon in the frame storing module; and a display module configured to enable the camera-directed 3D digital cartoon produced by the camera walking module to be displayed on the user's terminal.

According to another exemplary embodiment of the present invention, the digital cartoon content providing server further includes a sharing module which is configured to output a user-based camera direction list using the camera-directed 3D digital cartoon and provide a function for sharing with other users or a recommendation function in order for the camera-directed 3D digital cartoon selected by the others from the camera direction list to be displayed.

According to an exemplary embodiment of the present invention, the display module is characterized in that a high resolution and high speed graphic output function are provided by building a 3D acceleration environment on the web by adopting a 3D acceleration engine.

ADVANTAGEOUS EFFECTS

The system for providing a 3D digital cartoon viewer and a method thereof according to the present invention are advantageous in the way that a 2D digital cartoon viewer program or a 3D digital cartoon viewer program to a user terminal, and a digital cartoon viewer function is performed by automatically converting, based on a 3D game engine, a 2D digital cartoon into a 3D digital cartoon, and camera walking data that a user creates by freely adjusting a rotation angle using a control key is stored in each of frames for thereby providing a 3D digital cartoon content that a user may direct.

In addition, the system for providing a 3D digital cartoon viewer and a method thereof according to the present invention are advantageous in the way that a user may more conveniently see a cartoon by providing an additional function such as a screen enlarging or contracting function, a 3D 360° rotation function, a screen rotation function, etc., and a camera walking function that a user has directed based on a user's experience, may be stored and shared with, or recommended to other users, and an absorption degree and a realization degree of a 3D digital cartoon may be improved by using a visual effect.

In addition, the system for providing a 3D digital cartoon viewer and a method thereof according to the present invention are advantageous in the way that a user can conveniently see a digital cartoon along with a high resolution and high speed graphic output based on the use of a 3D acceleration engine, and digital cartoon production time may be saved by automatically converting a 2D digital cartoon into a 3D digital cartoon using a 3D game engine.

BEST MODES FOR CARRYING OUT THE INVENTION

According to the exemplary embodiment of the present invention, there is provided a method for providing a 3-Dimensional (3D) digital cartoon viewer which is executed by a digital cartoon content providing server which provides a 2D digital cartoon or a 3D digital cartoon, which includes a step (a) wherein when a 3D digital cartoon viewer function is selected by a user terminal, a predetermined 2D digital cartoon is converted into a 3D digital cartoon based on a 3D game engine forming a 3D image and is stored; a step (b) wherein a camera-directed 3D digital cartoon is produced by storing camera walking data created under a user's direction in a corresponding frame of the 3D digital cartoon; and a step (c) wherein the camera-directed 3D digital cartoon is displayed on the user terminal.

MODES FOR CARRYING OUT THE INVENTION

Since the description of the present invention is just an exemplary embodiment so as to describe a structure or a function, the scope of the right of the present invention should not be interpreted to be limited by the exemplary embodiments disclosed in the descriptions of the present invention. More specifically, since the exemplary embodiments of the present invention may be modified into various forms and may have various forms, the scope of the right of the present invention should be interpreted to include equivalents which may implement technical concepts. In addition, since the objects and effects of the present invention do not mean that a specific exemplary embodiment should include all the above objects or effects or should include only the effects, the scope of the present invention should be understood not to be limited by such things.

Meanwhile, the meaning of the terms used in the present invention should be interpreted as follows. The terms "a first", "a second", etc. are used so as to distinguish one component from other components, so the scope of the invention should not be limited by such terms. For example, a first component element may be named as a second component element, and in a similar way, the second component element may be named as the first component element.

When describing that a predetermined component element "is connected" to other component elements, it may mean that the predetermined component element may be directly connected to the other component elements, but it should be understood as being connected thereto through other component element disposed between the predetermined component element and the other component element. Meanwhile, when such connection is described like a predetermined component element "is directly connected" to other component elements, it should be understood that there is not any other component element between them.

Meanwhile, other expressions describing any relationship between component elements, namely, the terms such as "between ~" and "just between ~" or "neighboring with ~" and "directly neighboring with~" should be interpreted in the same way.

It should be interpreted that the expression in a singular form means including a plurality of expressions unless it is expressed in a clear form in a corresponding context, and the terms such as "include", "have", etc. are used to express the presences of an implemented feature, a number, a step, an operation, a component element, a partial component, etc., or a combination thereof, and it should be interpreted not to previously exclude any presence or an adding possibility of one or more other features, numbers, steps, operations, component elements, partial components, etc., or a combination thereof.

In each step, the identification symbols (for example, "a", "b", "c", etc.) are used for easier descriptions, and such identification symbols are not used so as to describe any sequence of steps, and each step may take place differently from the indicated sequences unless a specific sequence is indicated in a clear form in a corresponding context. Namely, each step may take place in the indicated sequence or may take place concurrently or may take place in the opposite sequence.

The present invention may be implemented in a form of codes in a computer readable recording medium which may be read by a computer, and a computer readable recording medium includes all kinds of recording devices in which data readable by a computer system is recorded. As an example of a computer readable recording medium, there are ROM, RAM, CD-ROM, a magnetic tape, a floppy disk, an optical data storage device, etc., and a computer readable recording medium implemented in a form of a carrier wave (for example, a transmission through the Internet) is also included. The computer readable recording medium may be distributed to the network-connected computer system, and may be executed since computer-readable codes are stored therein in a distributed manner.

All the terms used herein should be interpreted to have the same meaning as the terms that a person having ordinary skill in the art generally understands unless otherwise stated. The terms which are defined in an ordinary dictionary should be interpreted to coincide with the meaning in the context of the related technology, and should not be interpreted to have ideal or excessive informal meaning unless otherwise stated in the description of the present invention.

Figure 1:
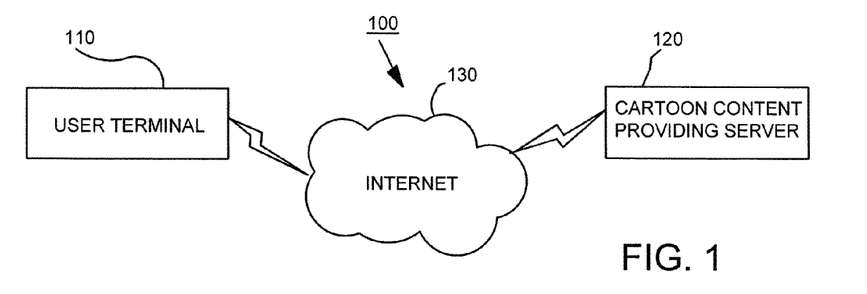
FIG. 1 is a block diagram for describing a system for providing a 3D digital cartoon viewer according to an exemplary embodiment of the present invention.

FIG. 1 is a block diagram for describing a system for providing a 3D digital cartoon viewer according to an exemplary embodiment of the present invention.

Referring to FIG. 1, the 3D digital cartoon providing system 100 includes a user terminal 110 and a digital cartoon content providing server 120. The user terminal 110 and the digital cartoon content providing server 120 may be connected through the internet 130.

The user terminal 110 is a terminal of an individual or an enterprise that has subscribed as a member of the digital cartoon content providing server 120, and generally may be a personal computer or may be any device to the extent that such a device is a terminal which has a data transmission and receiving function through the internet 130 including an internet connection. Namely, the user terminal 110 includes at least one among a desktop computer, a palm computer, a smart phone, a tablet computer and a mobile portable terminal capable of being carried.

The digital cartoon content providing server 120 may be a computing device which is capable of providing a digital cartoon viewer program, which is capable of displaying a 2D digital cartoon or a 3D digital cartoon, to the user terminal 110. In addition, the digital cartoon content providing server 120 may store a 3D digital cartoon camera-directed by the user terminal 110. Meanwhile, the digital cartoon content providing server 120 is not limited to a single computing device, but may be implemented using a plurality of computing devices which have distributed processing functions.

Figure 2:
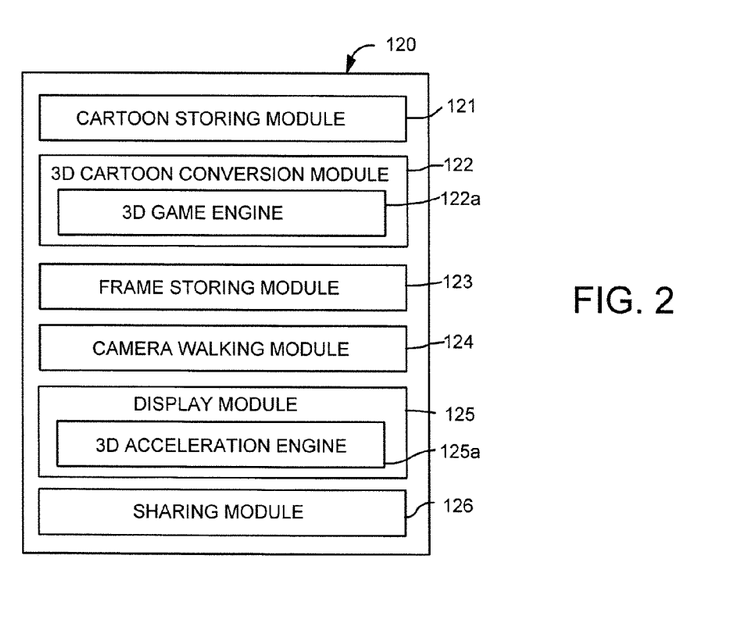
FIG. 2 is a block diagram for describing a digital cartoon content providing server of FIG. 1.

FIG. 2 is a block diagram for describing a digital cartoon content providing server of FIG. 1.

Referring to FIG. 2, the digital cartoon content providing server 120 includes a digital cartoon storing module 121, a 3D digital cartoon conversion module 122, a frame storing module 123, a camera walking module 124 and a display module 125.

The digital cartoon storing module 121 is configured to store a script file of a 2D digital cartoon or a 3D digital cartoon directed by an author or a cartoon file obtained by scanning a cell cartoon.

The 3D digital cartoon conversion module 122 is configured to convert a 2D cartoon into a 3D digital cartoon based on a 3D game engine 122a which forms a 3D image. The 3D game engine 122a may be applied in a variety of fields such as a game and application development, a construction simulation, a virtual reality augmentation, a 3D website building, a movie, a cartoon, a 3D product advertisement, etc.

In addition, the 3D digital cartoon conversion module 122 may use a variety of technologies that convert 2D image data into 3D image data. It is possible to convert a 2D digital cartoon into a 3D digital cartoon automatically, using a Z-depth value in such technologies.

The frame storing module 123 is configured to store by frames the 3D digital cartoon converted by the 3D digital cartoon conversion module 122.

The camera walking module 124 creates a camera walking data by walking up to (N+1)th, (N+2)th, (N+3)th, . . . , (M)th frames while the camera rotates from the (N)th frame to the (M)th frame selected by the user terminal 110 in the direction that the user has designated, and the thus created camera walking data are stored in the frame storing module 123, so that the camera-directed 3D digital cartoon can be produced. At this time, the camera walking module 124 is configured to adjust the camera walking freely by using a control key such as a keyboard direction key, a mouse, a pen, a pinch, etc.

The display module 125 enables the 3D digital cartoon to be displayed by providing to the user terminal 110 the camera-directed 3D digital cartoon produced by the camera walking module 124 since the digital cartoon viewer program of the user terminal 110 is executed. At this time, the display module 125 enables the high resolution and high speed graphics to be output by building the environment wherein the 3D acceleration is available on the web by using the 3D acceleration engine 125a.

When the function for sharing with the other users or recommendation function is selected by the user terminal 110, the sharing module 126 collects the camera-directed 3D digital cartoon, outputs the camera-directed list by users and enables the camera-directed 3D digital cartoon which is selected by the others from the camera-directed list to be displayed.

The digital cartoon storing module 121 and the frame storing module 123 may be built in the form of database or may be built in the form of a memory which is a high speed buffer.

Figure 3:
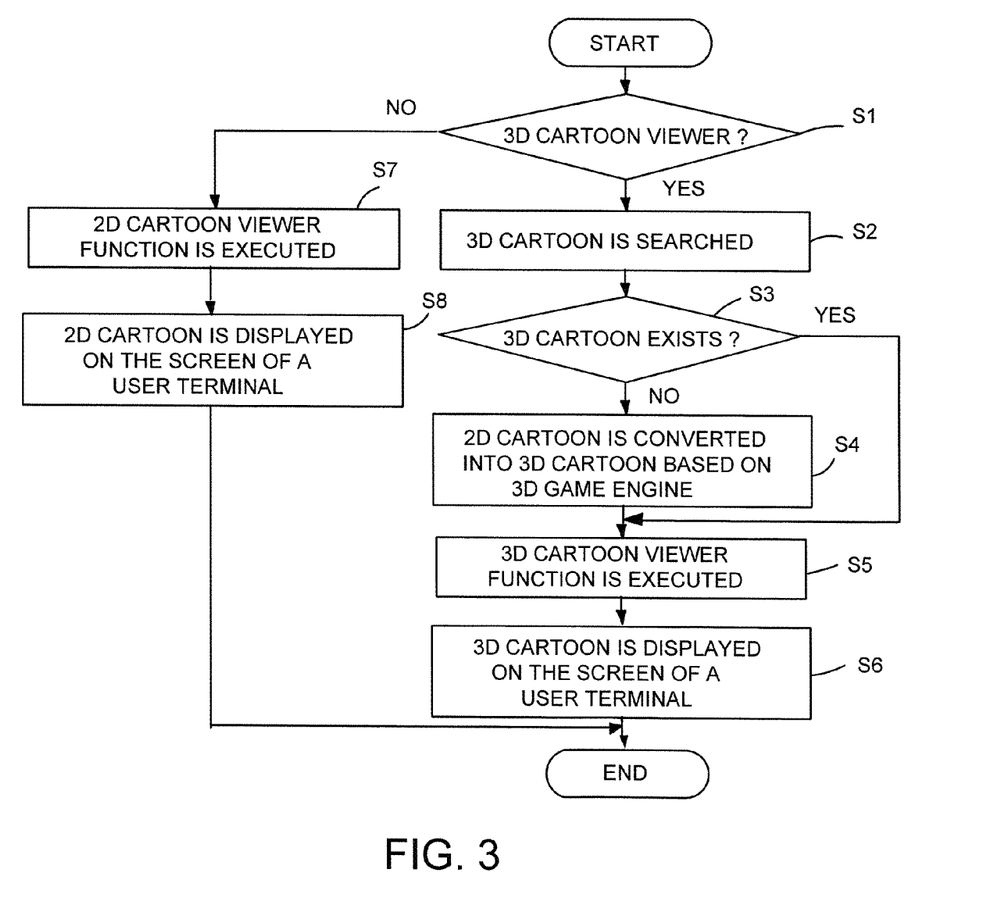
FIG. 3 is a flow chart for describing a method for providing a 3D digital cartoon viewer according to an exemplary embodiment of the present invention.

FIG. 3 is a flow chart for describing a method for providing a 3D digital cartoon viewer according to an exemplary embodiment of the present invention. FIG. 4 is a view illustrating a screen wherein a 2D digital cartoon is converted into, and output as, a 3D digital cartoon according to an exemplary embodiment of the present invention.

Referring to FIG. 3, the 3D digital cartoon providing method is characterized in that the digital cartoon content providing server 120 receives a connection request from the user terminal 110 and performs a connection process with respect to such a request and allows the user terminal 110 to select a 2D digital cartoon viewer function or a 3D digital cartoon viewer function. If the user terminal 110 selects a 3D digital cartoon viewer function, the digital cartoon content providing server 120 searches to determine whether the 3D digital cartoon which the user has selected exists in the frame storing module 123 (Steps S1 and S2).

At this time, when the user terminal 110 is first connected, the digital cartoon content providing server 120 provides a digital cartoon viewer program in order for a user to see a 2D digital cartoon or a 3D digital cartoon in the user terminal 110. The user terminal 110 receives a digital cartoon viewer program and stores in a memory and executes a digital cartoon viewer program when the 2D digital cartoon or the 3D digital cartoon is provided from the digital cartoon content providing server 120 and displays on the screen.

If the 3D digital cartoon does not exist in the frame storing module 123, the 3D digital cartoon conversion module 122 reads a script file of a corresponding 2D digital cartoon from the digital cartoon storing module 121 and converts, based on the 3D game engine 122a, the 2D digital cartoon into the 3D digital cartoon, and stores in the frame storing module 123 (Steps S3 and S4).

The display module 125 provides to the user terminal 110 the 3D digital cartoon viewer function which is converted by the 3D digital cartoon conversion module 122, and the user terminal 110 executes the digital cartoon viewer program and displays a corresponding 3D digital cartoon on the screen (Steps S5 and S6).

Figure 4A:
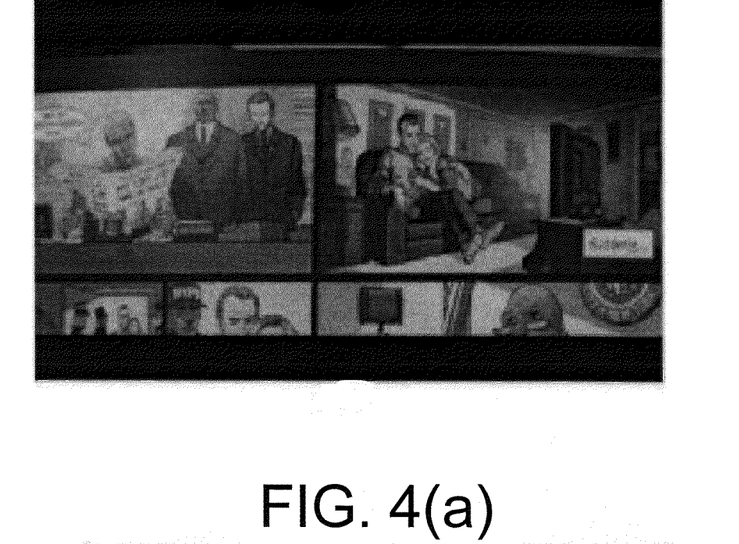
FIG. 4 is a view illustrating a screen wherein a 2D digital cartoon is converted into, and output as, a 3D digital cartoon according to an exemplary embodiment of the present invention.
Figure 4B:
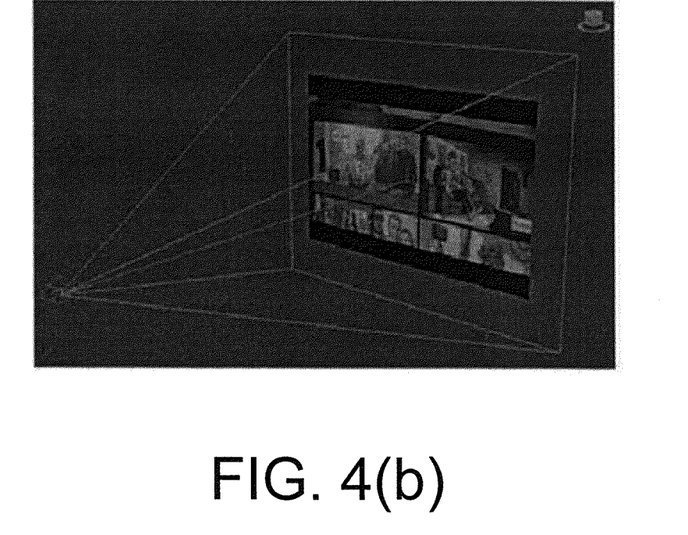

For example, the digital cartoon content providing server 120 converts the script file of the 2D digital cartoon as illustrated in FIG. 4(a) into the 3D digital cartoon, and displays the 3D digital cartoon as illustrated in FIG. 4(b).

If the user terminal 110 selects the 2D digital cartoon viewer function, the display module 125 reads the 2D digital cartoon selected by the user from the digital cartoon storing module 121 and provides it to the user terminal 110, and the user terminal 110 executes the digital cartoon viewer program and displays a corresponding 2D digital cartoon on the screen (Steps S7 and S8).

The display module 125 may provide additional functions such as the functions for enlarging, contracting, rotating 360°, or replaying the pages or the screens of the 3D digital cartoon using the digital cartoon viewer program. In addition, the display module 125 allows a user to enjoy the 3D digital cartoon more vividly thanks to the improved high resolution and high speed graphic output in such a way as to build a 3D acceleration environment on the web using the 3D acceleration engine 125a.

Figure 5:
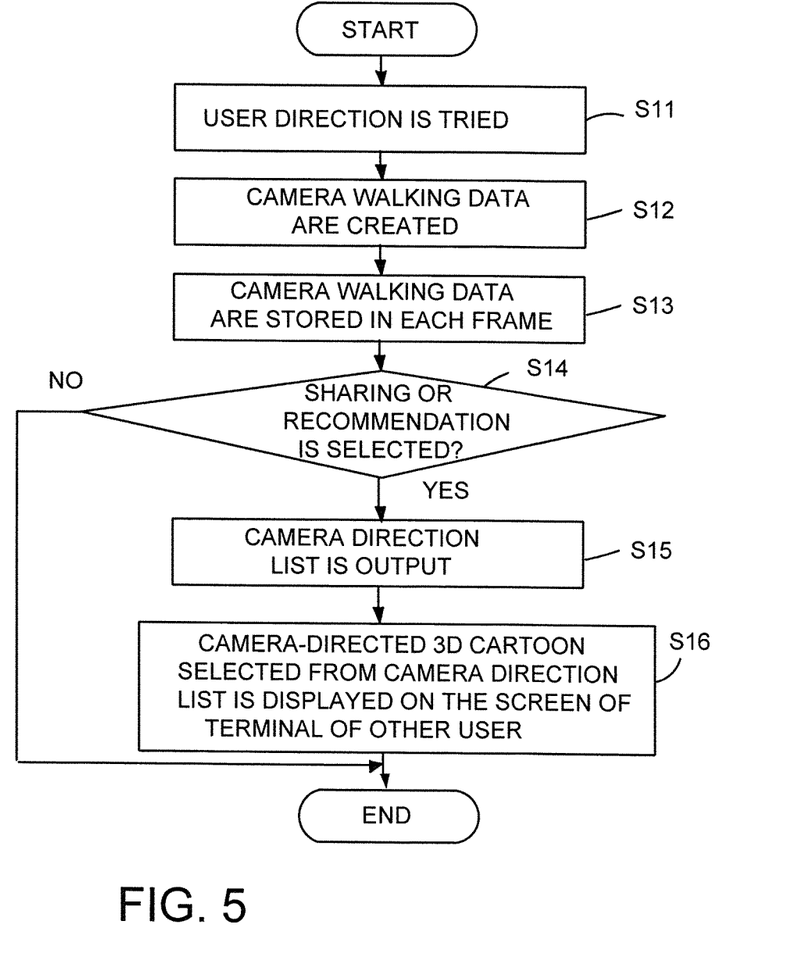
FIG. 5 is a flow chart for describing a method for providing a 3D digital cartoon viewer according to another exemplary embodiment of the present invention.
Figure 6:
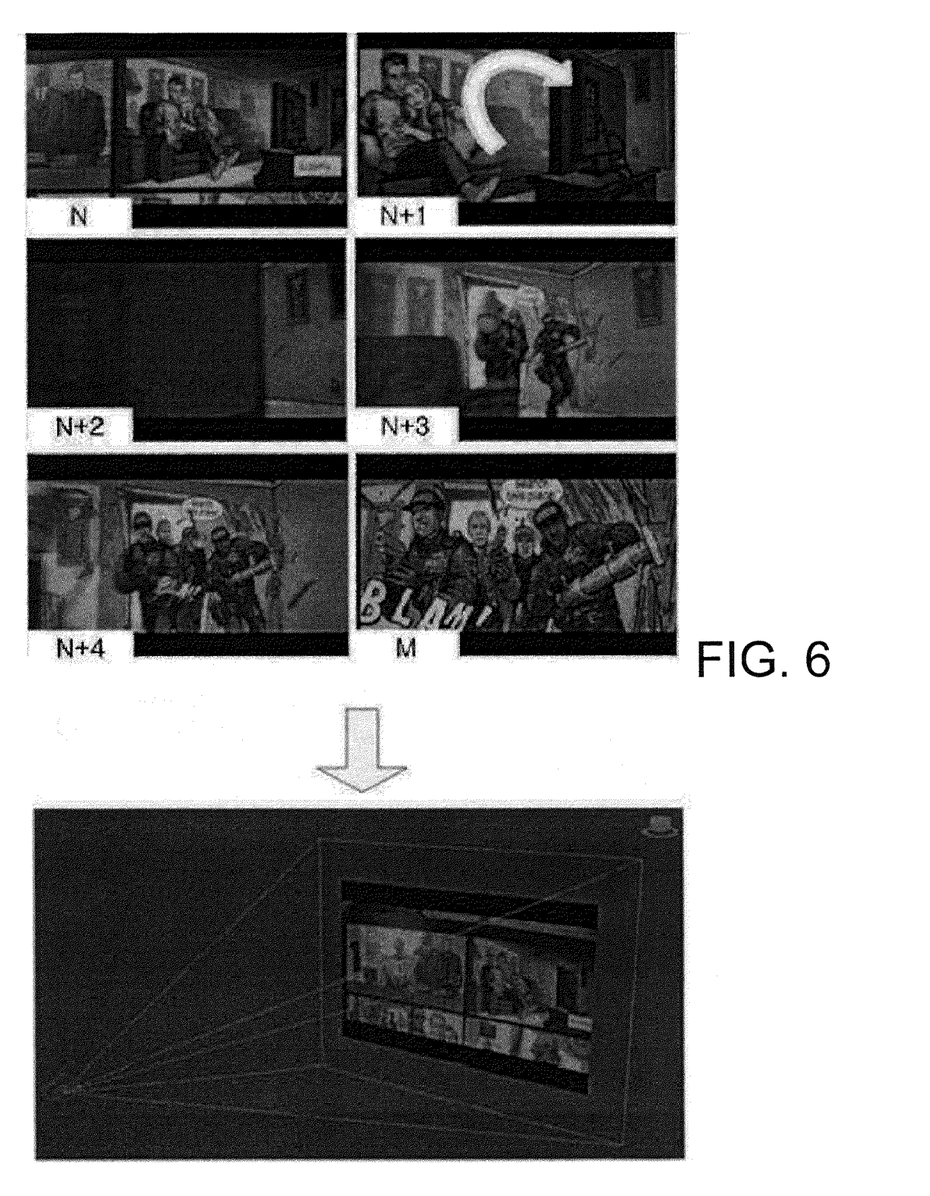
FIG. 6 is a view illustrating a screen wherein camera walking data are created according to an exemplary embodiment of the present invention.

FIG. 5 is a flow chart for describing a method for providing a 3D digital cartoon viewer according to another exemplary embodiment of the present invention. FIG. 6 is a view illustrating a screen wherein camera walking data are created according to an exemplary embodiment of the present invention.

Referring to FIG. 5, the digital cartoon content providing server 120 creates camera walking data from the (N)th frame which the user has selected to the (M)th frame when the user direction is performed in the user terminal 110 (Steps S11 and S12).

For example, as illustrated in FIG. 6, the camera walking module 124 moves to the (N+1)th frame and performs a camera walking and zoom-in function when it is recognized that the (N)th frame is double touched in the user terminal 110. Here, the camera walking is performed up to the (N+2)th, (N+3)th, (N+4)th and (M)th frames while the camera rotates using the control key at the (N+1)th frame. At this time, the camera walking module 124 may change the rotation angle using the control key. For example, the camera walking may be performed toward the door since the camera rotates toward behind the TV at the (N)th frame, but rotates in the direction of the arrow of the (N+1)th frame. It should be understood that the control key includes a motion recognition unit, and is not meant to exclude any other means in various forms within the scope where the same objects and functions may be achieved.

In addition, the camera walking module 124 is configured in order for a user to adjust the camera walking in a predetermined direction easily, using the control keys, and may be equipped with a special effect such as explosion, particles, water, etc., using VFX (Visual Effect).

The camera walking module 124 is configured to automatically and temporarily store the camera walking data created over a range from the (N+1)th frame to the (M)th frame, and when the user finally decides the 3D cartoon that the user himself has directed in the camera, camera walking data are stored in each frame and stored in the frame storing module 123, so that the camera-directed 3D digital cartoon may be produced (Step S13).

The sharing module 126 outputs a user-based camera direction list using the camera-directed 3D digital cartoon which the user has directed when the function for sharing with other users, or a recommendation function, is selected in the user terminal 110 (Steps S14 and S15).

When the terminal of the other user selects a predetermined 3D digital cartoon that he wants to see, from the camera direction list, the sharing module 126 enables a corresponding camera-directed 3D digital cartoon to be displayed on the terminal of the other user (Step S16).

INDUSTRIAL APPLICABILITY

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalents of such meets and bounds are therefore intended to be embraced by the appended claims.

The invention claimed is:

1. A method for providing a 3-Dimensional (3D) digital cartoon viewer which is executed by a digital cartoon content providing server which provides a 2D digital cartoon or a 3D digital cartoon, comprising:
   a step (a) wherein when a 3D digital cartoon viewer function is selected by a user terminal, a predetermined 2D digital cartoon is converted into a 3D digital cartoon based on a 3D game engine forming a 3D image and is stored;

a step (b) wherein a camera-directed 3D digital cartoon is produced by storing a camera walking data created under a user's direction in a corresponding frame of the 3D digital cartoon;

a step (c) wherein the camera-directed 3D digital cartoon is displayed on the user terminal; and further comprising a step (d) wherein when a function for sharing with other users or a recommendation function is selected by the user terminal, the user-based camera direction list is output, and the camera-directed 3D digital cartoon selected from the camera direction list is output.

2. A method for providing a 3-Dimensional (3D) digital cartoon viewer which is executed by a digital cartoon content providing server which provides a 2D digital cartoon or a 3D digital cartoon, comprising:

a step (a) wherein when a 3D digital cartoon viewer function is selected by a user terminal, a predetermined 2D digital cartoon is converted into a 3D digital cartoon based on a 3D game engine forming a 3D image and is stored;

a step (b) wherein a camera-directed 3D digital cartoon is produced by storing a camera walking data created under a user's direction in a corresponding frame of the 3D digital cartoon; and a step (c) wherein the camera-directed 3D digital cartoon is displayed on the user terminal;

wherein the step (a) includes a step wherein when a 3D digital cartoon viewer function is selected by the user terminal, the 2D digital cartoon is output.

3. A method for providing a 3-Dimensional (3D) digital cartoon viewer which is executed by a digital cartoon content providing server which provides a 2D digital cartoon or a 3D digital cartoon, comprising:

a step (a) wherein when a 3D digital cartoon viewer function is selected by a user terminal, a predetermined 2D digital cartoon is converted into a 3D digital cartoon based on a 3D game engine forming a 3D image and is stored;

a step (b) wherein a camera-directed 3D digital cartoon is produced by storing a camera walking data created under a user's direction in a corresponding frame of the 3D digital cartoon;

a step (c) wherein the camera-directed 3D digital cartoon is displayed on the user terminal;

wherein the step (c) is characterized in that when the 3D digital cartoon is displayed, at least one additional function from the group consisting of, enlarging, contracting, rotating 360°, and replaying the pages and screens of the 3D digital cartoon, is carried out.

4. The method of claim 1, wherein the step (b) is characterized in that when a camera walking data is created under a user's direction, a special effect is added by using a VFX (Visual Effect).

5. The method of claim 1, wherein the step (c) is characterized in that when the 3D digital cartoon is displayed, a high resolution and high speed graphic output is produced by building a 3D acceleration environment on the web by adopting a 3D acceleration engine.

6. The method of claim 2, wherein the step (b) is characterized in that when a camera walking data is created under a user's direction, a special effect is added by using a VFX (Visual Effect).

7. The method of claim 2, wherein the step (c) is characterized in that when the 3D digital cartoon is displayed, a high resolution and high speed graphic output is produced by building a 3D acceleration environment on the web by adopting a 3D acceleration engine.

8. The method of claim 3, wherein the step (b) is characterized in that when a camera walking data is created under a user's direction, a special effect is added by using a VFX (Visual Effect).

9. The method of claim 3, wherein the step (c) is characterized in that when the 3D digital cartoon is displayed, a high resolution and high speed graphic output is produced by building a 3D acceleration environment on the web by adopting a 3D acceleration engine.

* * * * *